H. M. STARK.
ROTARY WHEEL HARROW.
APPLICATION FILED JUNE 12, 1915.

1,241,046.

Patented Sept. 25, 1917.

Inventor
H. M. Stark.
By Geo. P. Kimmel.
Attorney

UNITED STATES PATENT OFFICE.

HELON M. STARK, OF WILLIAMS, ARIZONA.

ROTARY WHEEL-HARROW.

1,241,046.  Specification of Letters Patent.  Patented Sept. 25, 1917.

Application filed June 12, 1915. Serial No. 33,738.

*To all whom it may concern:*

Be it known that I, HELON M. STARK, a citizen of the United States, residing at Williams, in the county of Coconino and State of Arizona, have invented certain new and useful Improvements in Rotary Wheel-Harrows, of which the following is a specification.

This invention relates to improvements in harrows and diggers, and more specifically to rotary wheel-harrows.

The object of my invention is to provide a wheel-harrow having a rotary harrow plate that will revolve with great rapidity, thereby thoroughly pulverizing, smoothing, and leveling the earth, ready for planting, and with but one operation, thereby obviating the necessity for going over the same ground twice. I have provided power transmitting mechanism for operating the harrow member, whereby the harrow will be capable of adjustment while operating. This is accomplished by adopting means whereby the rotating mechanism will always be in engagement regardless of the position at which the harrow plate may be adjusted.

Furthermore, my device is extremely simple in construction and operation, durable, and efficient for the purpose intended.

Other objects of this invention not at this time more particularly enumerated, will be clearly understood from the detailed description and drawings forming a part of this specification.

Furthermore, this invention consists in the novel arrangements and combination of parts more particularly described in the following specification and embodied in the claims appended hereunto and forming a part of this application.

Referring now to the drawings, which are merely illustrative of my invention,

Figure 1:
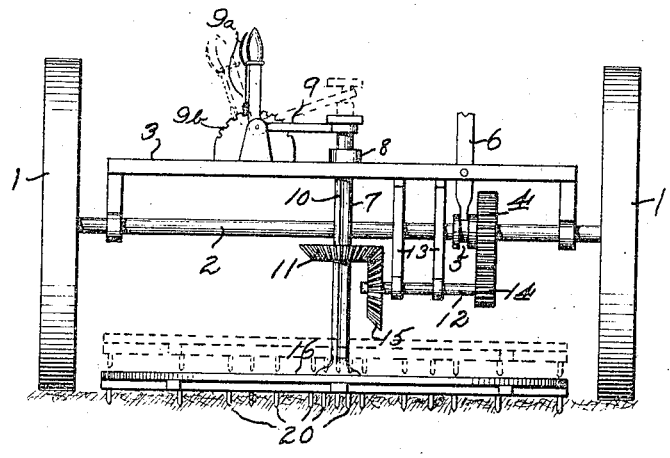
Figure 1 is an end elevation of my rotary wheel-harrow.
Figure 2:
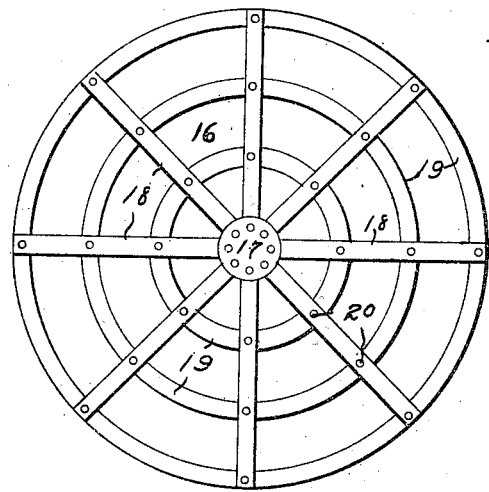
Fig. 2 is a bottom plan view of the harrow plate.

Referring further to the drawings, wherein similar reference characters designate similar parts throughout the respective views, 1 designates the main drive wheels, mounted upon a revolving axle 2, upon which is mounted a suitable carrying frame 3. A gear wheel 4 is loosely mounted at a certain point upon the axle 2 and is operatively engaged and disengaged therewith by means of a clutch 5 fixedly mounted upon said axle and operated by means of a clutch lever 6 pivoted upon the carrying frame 3.

A vertically disposed harrow shaft 7 is adjustably mounted within a bearing 8 centrally of the carrying frame 3. A bell-crank lever 9 is pivotally mounted upon said frame, and is adapted to engage with the upper end of said shaft 7, whereby said shaft may be adjusted vertically within the bearing 8. Said harrow shaft 7 is formed with a key slot 10 along the length thereof, and a bevel gear 11, provided with a key (not shown) adapted to engage with said slot, is loosely mounted upon said shaft. A spring pawl 9$^a$ is secured upon said bell-crank lever 9 and is adapted to engage with a sector ratchet 9$^b$ mounted upon said frame 3 adjacent said lever.

A horizontally disposed shaft 12 is mounted upon bearings 13 fixedly secured to the carrying frame 3 at a point intermediate the gear 4 and the harrow shaft 7. A pinion 14 is mounted upon one end of said shaft 12, and is adapted to mesh with the gear 4. A bevel-gear 15 is mounted upon the other end of said shaft 12, and is adapted to mesh with the bevel gear 11.

A harrow plate generally designated by 16 is formed of a circular plate member 17 having radially disposed arms 18 mounted thereon, and a plurality of ring members 19, graduated in circumference, mounted upon said arms. The securing elements between said plate 17 and said arms 18, and between said ring members 19 and said arms 18, are adapted to project from one side of said plate and at right angles to the face thereof, thereby forming a plurality of harrow teeth 20. Said harrow plate 16 is fixedly mounted, centrally thereof, upon the lower end of said shaft 7.

From the construction shown and described, it is obvious that the gear wheel and pinion are adapted to transmit motion to the bevel gears, when the clutch is thrown into engagement with said gear wheel, thereby rotating the harrow plate. Furthermore, it will be seen that the key slot in the vertical harrow shaft will permit of said harrow plate being raised or lowered so that the teeth thereon will engage with the earth as desired, at the same time maintain the rotating mechanism constantly engaged. The vertical adjustment of said shaft also permits of the harrow plate being raised entirely out of engagement with the earth so as to facilitate the movement of the harrow from place to place.

The utility, adaptability, and advantages of my improved form of rotary wheel-harrows being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention, and falling within the purview of the appended claim.

What I claim as my invention and desire to secure by Letters Patent is:

A device of the character described the combination with a pair of drive wheels, and a power shaft connecting said drive wheels, of a carrying frame mounted on said power shaft, a gear wheel loosely mounted on said power shaft, means associated with said gear wheel to operatively engage and disengage said gear with the power shaft, bearings secured to said frame, a counter-shaft mounted upon said bearings in parallel relation to the power shaft, a pinion mounted on one end of the counter-shaft in mesh with said gear wheel, a bearing mounted centrally of the carrying frame, a vertical shaft mounted in said bearing having a keyway therein, a bevel gear on said vertical shaft engaged with the keyway, a second bevel gear mounted on the free end of the counter-shaft and in meshing relation with the gear on the vertical shaft, said keyway permitting vertical reciprocation of said harrow shaft relative to the first said bevel gear to adjust the height of the harrow.

In testimony whereof I affix my signature hereto.

HELON M. STARK.

Copies of this patent may be obtained for five cents each, by addressing the "Commissioner of Patents, Washington, D. C."